Aug. 18, 1953 W. P. MASON 2,649,574

HALL-EFFECT WAVE TRANSLATING DEVICE

Filed April 5, 1951

INVENTOR
W. P. MASON
BY N. S. Ewing
ATTORNEY

Patented Aug. 18, 1953

2,649,574

UNITED STATES PATENT OFFICE 2,649,574

HALL-EFFECT WAVE TRANSLATING DEVICE

Warren P. Mason, West Orange, N. J., assignor to Bell Telephone Laboratories, Incorporated, New York, N. Y., a corporation of New York Application April 5, 1951, Serial No. 219,342

15 Claims. (Cl. 332—51)

This invention relates to electrical wave translating devices employing the Hall effect and more particularly to Hall-effect modulators and related devices providing for the controlled variation of waves translated thereby.

A principal object of the present invention is to provide Hall-effect devices of the kind described that are well adapted for operation with waves of high frequency and for operation over a broad band of frequencies.

The Hall-effect unit employed in specific embodiments of the invention hereinafter described comprises a right prism of square cross section, or a square plate, of semiconductive material having four metal electrodes, or contacts, plated on two pairs of opposite side faces; and an electromagnet is arranged to direct a magnetic field through the material perpendicularly to the pair of end faces. Hall effect, which involves the deflection of electrons moving across a magnetic field, is of such nature that a potential difference established across one electrode pair results in a potential difference across the other electrode pair of a magnitude and polarity depending on the strength and direction of the magnetic field.

In a translating device embodying the present invention carrier waves are applied to one of the two electrode pairs of the Hall-effect unit; control currents, which may be complex modulating waves, or signals, are applied to the coil of the electromagnet; and modified carrier waves are taken from the other electrode pair. The device also includes features tending to make it operative over a broad frequency range, to increase efficiency and power-dissipating capacity, and to suppress transmission of an unmodulated carrier wave component particularly at frequencies of the order of $10^4$ cycles per second and higher.

One feature of a modulator in accordance with the invention resides in the association of impedance elements with the electromagnet in such manner that the strength of the magnetic field is independent of frequency over a wide range of modulating frequencies.

Another feature of the invention resides in an optimum correlation between the impedances of the connected external circuits and the parameters of the semiconductive body for reduced power loss.

Still another feature relates to the dimensioning of the semiconductive body in relation to operating parameters for increased power capacity.

In accordance with a further feature the semiconductive body is oriented in a unique manner with reference to certain significant axes of the crystalline material of which it is composed, to minimize electrical unbalance in the unit and unwanted coupling between the respective electrode pairs, to increase the ratio of the voltage, due to Hall-effect, appearing at the "output" electrode pair to the voltage applied to the "input" electrode pair, and thereby also to reduce power loss in the body.

Other features of the invention reside in the association of a Hall-effect unit with a microwave guide to control transmission therethrough.

The nature of the present invention and its various features, objects and advantages will appear more fully on consideration of the embodiments to be described hereinafter with reference to accompanying drawings.

Figure 1:
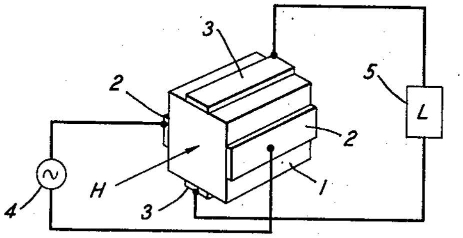
Fig. 1 illustrates the prototype Hall-effect unit and associated circuit.

Referring more particularly to Fig. 1 there is shown a Hall-effect unit comprising a body 1 of semiconductive material in the form of a rectangular hexahedron of square cross section with respective rectangular electrodes on the four equal faces thereof. The semiconductive material may be silicon, for example, or preferably monocrystalline n-type germanium, the latter having the highest drift velocity of any known material. The four electrodes, which are alike in size and centrally positioned on the respective faces, are of conductive material and may be formed by plating or vapor-deposition on the crystal in known manner. Rhodium has about the same temperature coefficient of expansion as germanium and has been used to advantage as an electrode metal on units of the latter material. One pair 2 of opposite electrodes is connected to an input circuit that includes an electric current source 4, while the other pair 3 of opposite electrodes is connected to an output circuit that includes a load 5. At H is symbolized a magnetic field that is substantially uniform over the square cross section of the crystal and that passes through it substantially perpendicularly to the square faces in what may be designated as the 'axial" or "thickness" direction.

The source 4 tends to cause electrons to flow from one electrode 2 to the other, with no effect on the electrodes 3, but the magnetic field deflects such electrons to greater or less extent toward one or the other of the electrodes 3 with the result that a potential difference appears across electrodes 3 and current flows in the output circuit. If the magnetic field is constant and the current in the input circuit is variable, e. g., alternating, the current in the output circuit tends to vary correspondingly. The correspondence persists up to frequencies approximating the relaxation frequency of the semiconductive material at which the distributed capacity in the material produces a displacement current as large as the conduction current. The relaxation frequency is inversely proportional to the resistivity and dielectric constant of the material; and it is approximately $2.5 \times 10^{10}$ cycles per second for germanium having a dielectric constant of 19 and a resistivity of 4 ohms centimeter. Hence the Hall-effect unit can be considered to be resistive, and the Hall-effect voltage will be independent of frequency, well up into the microwave range of frequencies.

Figure 2A:
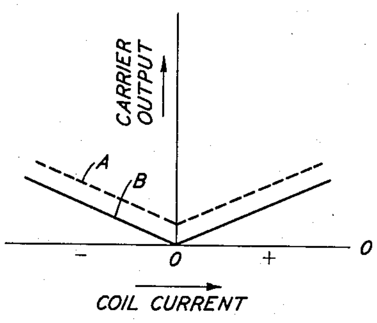
Figs. 2 and 3 illustrate translating devices in accordance with the present invention, Fig. 2A showing an operating characteristic thereof.
Figure 2:
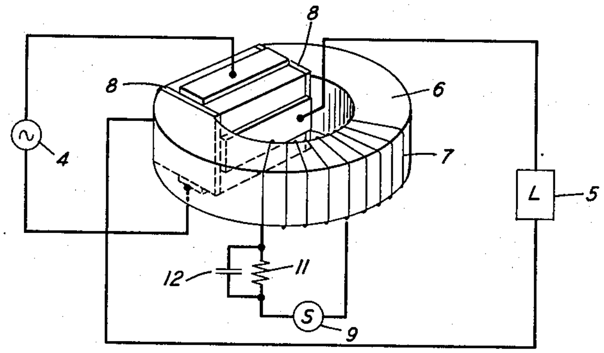

In a high frequency modulator embodying the present invention, as illustrated in Fig. 2, the magnetic field for the described Hall-effect unit is provided by an electromagnet comprising a C-shaped core 6 of magnetic material having an energizing winding or coil 7 wound thereon. The core 6 is of substantially the same square cross-section as the crystal body 1 which is disposed in the air gap, so that the magnetic field established in the body is substantially homogeneous throughout it and so also the field is concentrated as largely as possible in the body. The core is designed to provide maximum flux density and minimum hysteresis, and for this purpose may be composed of Permalloy or of laminations of an iron-silicon alloy. A thin plate 8 of mica or other suitable insulating material is interposed between each square end of the unit and the core 7. Each may be glued in place to provide for maximum conduction of heat from the unit to the core, for the present invention contemplates operation at power levels such that overheating of the unit may be a limiting factor.

It may be assumed that the source 4 in Fig. 2 is a source of high frequency carrier waves, that is, unmodulated sinusoidal waves, and that corresponding waves are delivered to the output circuit or load 5 in attenuated form. The attenuation, or relative strength of the output waves, depends on the strength of the control current supplied to coil 7 as previously indicated. The relation between the root means square value of the carrier current in the output circuit and the instantaneous value of the control current is shown graphically in Fig. 2A. Generally the relation is as shown by the dotted line A from which it will be seen that the carrier output current varies substantially linearly with the variations in the control current. However, it is to be noted that even when the control current is zero there is a certain amount of leakage of carrier current to the output circuit and that this leakage persists notwithstanding apparently perfect electrical and mechanical symmetry in the construction. The presence of such carrier leakage is generally undesirable. One disadvantage is that, because of it, the output current is not directly proportional to the control current. Another is that the leakage current may be comparable in magnitude to the variations in carrier output current, as might well be the case, for example, if the control current were a feeble fluctuating direct current.

Figure 4:
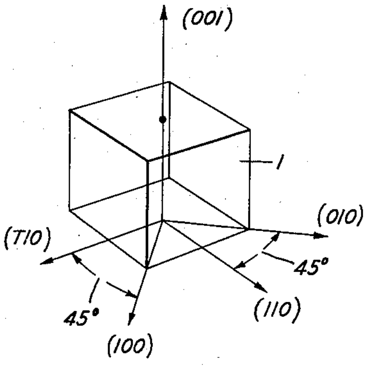
Fig. 4 illustrates the orientation of the crystalline body relative to the crystallographic axes.

In accordance with a feature of the present invention the described leakage of carrier current is substantially reduced or eliminated by observing certain relationships between the axis and planes of the semiconductive body and certain significant axes of the crystal from which the body is cut. I preceive that the effective electrical symmetry of a Hall-effect unit depends not only on static resistivity but also on the resistance associated with the magneto-resistive effect. In the presence of a magnetic field the latter resistance is a function of orientation and the inter-electrode current tends to follow the skew path of least resistance. In any event it is advantageous to have the axis, or thickness dimension, of the body coincide with one of the three mutually perpendicular crystallographic axes of the material, so that the direction of the magnetic field coincides with one of the crystallographic axes. It is along these latter axes that the aforementioned magneto-resistive resistance is least. Still greater advantage is to be realized by having the two other crystallographic axes lie substantially along diagonals of the cross section of the body, i. e., in directions substantially bisecting the dihedral angle formed by adjacent electrodes. Otherwise stated, and as illustrated in Fig. 4, the axis, or thickness dimension of the body 1 may have the same direction as the (001) crystallographic axis, in which case the length and width dimensions of the body should lie parallel to the (110) and $(\bar{1}10)$ axes of the material. The direction of these crystallographic axes may be ascertained in known manner by X-ray examination of the crystal.

With effective dissymmetry substantially eliminated in the foregoing manner, the unwanted leakage of energy from input circuit to output circuit disappears, and the characteristic curve is shifted down to the axis as shown by the solid line B in Fig. 2A. In such case the control current can be used to adjust the attenuation of the unit over a substantially wider percentage range and to turn the carrier output current on and off at will in the manner of a switch.

The source 9 of control current in Fig. 2 may supply modulating waves of complex form, such as speech waves for specific example, to the coil 7 in which case corresponding signal-modulated carrier waves appear in the load circuit 5. Assuming the carrier frequency $f_c$ to be at least twice the highest frequency component of the signal $f_s$, the modulation products delivered to the output circuit consist of the two second-order side bands viz. $(f_c+f_s)$ and $(f_c-f_s)$. Notably absent is any unmodulated carrier component and any other modulation products; no filter need be interposed in the output circuit unless it be desired to separate one of the side bands from the other.

In order to take full advantage of the inherently pure-product characteristic of the Fig. 2 moludator the present invention provides for the association of impedance elements with the coil 7 such that over the frequency band of the signal source 9 the current in the coil is directly proportional to the signal voltage. The coil 7, it is to be noted, has a substantial self-inductance which not only limits the current flow (and flux density) but which also is frequency selective, tending to impede current in proportion to its frequency. The coil inductance could be tuned out or resonated at a signal frequency by inserting a condenser in series with it, and this would be feasible if the carrier and signal sources 4 and 9 were to be interchanged. This expedient is not applicable, however, where the modulating signal occupies a wide frequency band. For the latter case the coil 7 is incorporated in a low-pass filter section whose resistance is nearly constant up to the cut-off frequency. In the specific embodiment shown in Fig. 2 the filter section comprises in addition to the coil 7 of inductance L a series condenser 12 of capacitance C shunted by a resistor 11 of resistance R equal to $\sqrt{LC}$. With such an arrangement the current through the coil can be made substantially independent of frequency up to a frequency approximating (e. g. 75 per cent of) the cut-off frequency $f_c$ which is given by $$f_c^2 = \tfrac{1}{4}\pi^2 LC$$

If the inductance is, for example, 0.5 henry, the capacitance 250 micromicrofarads and the resistance 44,500 ohms, then $f_c = 14{,}200$ cycles per second and the impedance $Z_0$ looking into the network is $\sqrt{L/C}$ or 44,500 ohms. Since the total impedance presented to the source 9 is practically a pure resistance up to about 10,000 cycles per second in this case, it will be appreciated that the current flow from source 9, and therefore the current flow through coil 7, is substantially independent of frequency over the significant speech frequency range.

Maximum utilization of the carrier wave power supplied by source 4 is secured, in accordance with a further feature of this invention, by observing a certain relationship between the impedance of source 4, the impedance of the load 5 and certain constants of the Hall-effect unit. If the source and load impedances are both resistances $Z_S$ and the Hall-effect unit is of square cross section, the insertion loss L can be shown to be given by the following expression $$L = \frac{2Z_S R_{12}}{(Z_S + R_{11})^2 + R_{12}^2}$$

where $R_{11}$ is the resistance measured, at the carrier frequency, across the input electrodes with the output circuit open-circuited, and $R_{12}$ is the ratio of the output, or Hall voltage, to the current flowing in the input circuit with the output again open-circuited. By equating to zero the derivative of the loss with respect to the terminating resistances $Z_S$, it can be shown further that the minimum loss occurs when the following relation holds:

$$Z_S = \sqrt{R_{11}^2 + R_{12}^2}$$

The amount of useful power, viz., sideband power, that can be derived from a modulator of the kind described can be increased by increasing the strength of the applied carrier, but improvement in this direction is limited by overheating of the Hall-effect unit. The heating of the unit is due, in part, to the dissipation of carrier power in the semiconductive material. This power loss $P_c$ amounts to:

$$P_c = \frac{E^2 l_1 l_3}{\rho l_2}$$

where E is the root means square voltage of the applied carrier wave, $\rho$ is the resistivity of the semiconductive material in ohm-centimeters, $l_1$ is the thickness of the body, $l_2$ is the dimension of the body between input electrodes, and $l_3$ is the dimension of the body between output electrodes, assumed to be at least nearly equal to $l_2$. Eddy current losses due to the varying magnetic field in the body contribute also to the heating effect. The power loss $P_e$ due to eddy currents is given by the following equation:

$$P_e = \frac{\pi^3 f^2 B^2 l_1 l_2^2 l_3^2 \times 10^{-16}}{2\rho}$$

where $f$ is the frequency with which the flux is changed sinusoidally, and B is the maximum value of the flux density.

Maximum useful power output is realized only if the foregoing pair of loss components are equal to each other. Equating them, and assuming $l_2 = l_3$, one arrives at the following significant relation:

$$l_2 = l_3 = 6700 \times \sqrt{E/fB} \text{ centimeters}$$

Hence this optimum condition is independent of the resistivity $\rho$ and the thickness $l_1$, and these factors can be adjusted independently of the others to fix the total power dissipation at the thermal limit. If the carrier input voltage is ten volts, e. g., the modulating frequency 10,000 cycles per second, and the maximum flux density 17,000 lines per square centimeter, the equation last above calls for optimum dimensions of $l_2$ and $l_3$ of 1.6 centimeters. Where the modulating wave is not of a substantially single frequency, but like speech-bearing waves occupies a relatively wide frequency band, the frequency $f$ to be used in the foregoing calculation is the top frequency that is to be transmitted and, for maximum undistorted power output, B may be taken as the peak value of flux density.

The translating device herein disclosed is well adapted for direct-current amplifying systems of the type in which the direct-current modulated carrier output of a modulator is passed through a carrier wave or sideband amplifier and then demodulated, for the present modulator is not subject to drift effects. Negative feedback may be applied to such a system to enhance stability and linearity.

Figure 3:
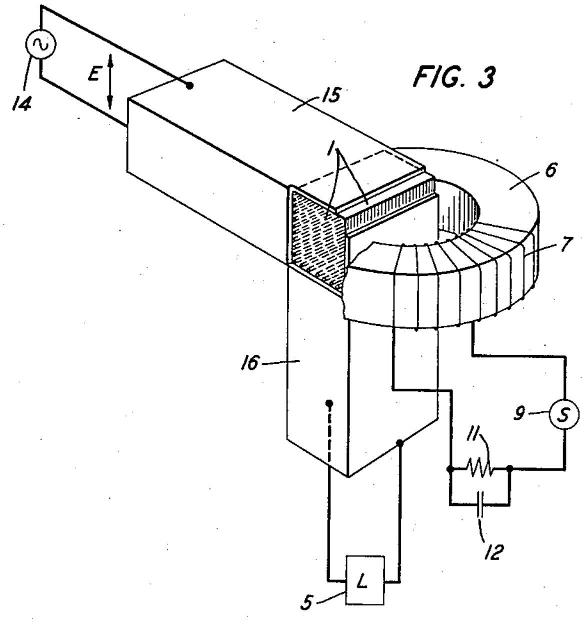

Fig. 3 illustrates a modification of Fig. 2 that is specially adapted for operation in the microwave frequency range and that may incorporate the features described with reference to Fig. 2. A microwave carrier source 14 is coupled in any suitable manner to a hollow conductive pipe or wave guide 15 of rectangular cross section to cause carrier waves to be propagated therein in the dominant mode. A second wave guide 16 of the same cross section joins the first to form a right-angled E-plane bend or elbow. Within the junction the semiconductive body 1 is disposed, in the form of a square prism with its axis perpendicular to the plane of the bend. The outermost walls of the two guides 15 and 16 lie in contact with adjacent faces of the body 1 and are separated from each other at the outermost corner so that they may serve as electrodes. Each of the other electrodes comprises a screen of metallic wires disposed across a respective face of the body 1 parallel to the axis thereof. The two screens are permeable to the guided carrier waves inasmuch as the wires comprising them are perpendicular to the direction of the electric field. The cross section of the body 1 may be made just large enough to block both of the wave guides so that no carrier wave energy passes from one to the other except as it is subject to the Hall effect in body 1. Both the latter and the electrode screens are insulated at their ends from the side walls of the guide.

The electromagnet 6, 7 is disposed as in Fig. 2 with the Hall-effect unit interposed in its magnetic circuit. The control circuit may be the same as that described with reference to Fig. 2. In operation it will be understood carrier waves passing from guide 15 to output guide 16 are attenuated or modulated in conformity with the variations in control current supplied to coil 7. Whereas certain of the considerations involved in the design of Fig. 2 tend to restrict the choice of dimensions for the semiconductive body these restrictions can be circumvented for the purposes of Fig. 3 by proper choice of the conductivity of the material. This can be done by proper selection of the kind and amount of impurity incorporated in the body, as treated, for example, by Lark-Horovitz in "Conductivity in Semiconductors," Electrical Engineering, December 1949, or by W. Shockley in "Electrons and Holes," D. Van Nostrand, 1951, pages 18, 19.

Although the present invention has been described largely in terms of specific embodiments it will be understood that these are, in part, illustrative and that various other embodiments within the spirit and scope of the invention will be evident to those skilled in the art.

What is claimed is:

1. In combination, a Hall-effect unit comprising a body of semiconductive material provided with two sets of electrodes, input circuit means to supply unmodulated carrier waves of a frequency of at least $10^4$ cycles per second to one of said sets of electrodes, output circuit means to receive said waves from the other of said sets of electrodes, and control circuit means to produce in said body a magnetic flux variable in strength in conformity with variations in a control current, whereby said received waves vary in conformity with said control current.

2. In combination, a Hall-effect unit comprising a body of semiconductive material provided with two sets of electrodes, input circuit means to supply unmodulated high frequency carrier waves to one of said sets of electrodes, output circuit means to receive said waves from the other of said sets of electrodes, and control circuit means to produce in said body a magnetic flux variable in strength in conformity with variations in a control current, whereby said received waves vary in conformity with said control current, said body being a crystalline body disposed with a crystallographic axis thereof in alignment with said magnetic flux.

3. In combination, a Hall-effect unit comprising a body of semiconductive material provided with two sets of electrodes, input circuit means to supply unmodulated high frequency carrier waves to one of said sets of electrodes, output circuit means to receive said waves from the other of said sets of electrodes, and control circuit means to produce in said body a magnetic flux variable in strength in conformity with variations in a control current, whereby said received waves vary in conformity with said control current, said body being a crystalline body disposed with the direction of the magnetic field along one crystallographic axis and the directions of current input and output in directions 45 degrees between the other two crystallographic axes.

4. In combination, a Hall-effect unit comprising a body of semiconductive material provided with two sets of electrodes, input circuit means to supply unmodulated high frequency carrier waves to one of said sets of electrodes, output circuit means to receive said waves from the other of said sets of electrodes, and control circuit means to produce in said body a magnetic flux variable in strength in conformity with variations in a control current, whereby said received waves vary in conformity with said control current, said last-mentioned means comprising an electromagnet having an energizing coil and a control circuit connected to said coil including impedance elements forming with said coil a filter section having a substantially constant resistance over a band of frequencies.

5. In combination, a Hall-effect unit comprising a crystalline body of semiconductive material, a crystallographic axis of which coincides with a geometrical axis thereof, and electrodes in contact with the surface of said body, and magnetizing means including a core of magnetic material having a gap therein, said body being disposed in said gap with said crystallographic axis extending in the direction of the magnetic field therein.

6. In combination, a Hall-effect unit comprising a crystalline body of semiconductive material, electrodes in contact with the surface of said body, and magnetizing means including a core of magnetic material having a gap therein, said body being disposed in said gap with a crystallographic axis thereof extending in the direction of the magnetic field therein.

7. A Hall-effect unit comprising a monocrystalline body of semiconductive material in the shape of a prism, a crystallographic axis of said body coinciding with a geometric axis of said prism, and electrodes in contact with respective different side faces of said body.

8. In combination, an electromagnet comprising a core of magnetic material having a gap therein and an energizing winding thereon, a Hall-effect unit disposed in said gap and comprising a crystalline body of semiconductive material having input and output electrodes thereon, a source of high frequency carrier waves connected to said input electrodes, a control circuit including a modulating current source connected to said winding, and a load circuit connected to said output electrodes to receive modulated carrier waves therefrom, said crystalline body having its crystallographic axes oriented in said gap for maximum effective electrical symmetry of said unit whereby to minimize leakage of carrier wave energy into said load circuit.

9. In combination, an electromagnet comprising a core of magnetic material having a gap therein and an energizing winding thereon, a Hall-effect unit disposed in said gap and comprising a crystalline body of semiconductive material having input and output electrodes thereon, a source of high frequency carrier waves connected to said input electrodes, a control circuit including a modulating current source connected to said winding, and a load circuit connected to said output electrodes to receive modulated carrier waves therefrom, said modulating source being a source of complex waves occupying a predetermined frequency band, said control circuit including impedance elements interposed between said modulating source and said winding proportioned with respect to the impedance of said winding to render the modulating current in said winding substantially proportional to the voltage of said modulating source over said frequency band.

10. In combination, a conductively bounded passage, a body of semiconductive material disposed within said passage, means to transmit polarized high frequency electromagnetic waves through a first section of said passage to said body, means to pass magnetic flux through said body in a direction normal to both the direction of transmission of said waves and the direction of polarization of said waves, said passage having a second section adjacent said body disposed normal to said first-mentioned direction to receive high frequency waves modified by Hall-effect in said body.

11. In combination, a uniconductor pipe guide for high frequency electromagnetic waves, said guide having a right-angle bend therein, a prismatic body of semiconductive material disposed within said guide at the said bend with its prismatic axis normal to the plane of the bend, and an electromagnet comprising a core of magnetic material disposed to pass magnetic flux through said body in the direction of said axis.

12. A combination in accordance with claim 11 in which said body fills the said bend.

13. A combination in accordance with claim 11 including respective wave-permeable electrodes for a plurality of longitudinal faces of said body.

14. In combination, an electromagnet comprising a core of magnetic material having a gap therein and an energizing winding thereon, a Hall-effect unit disposed in said gap and comprising a crystalline body of semiconductive material having input and output electrodes thereon, a source of carrier waves connected to said input electrodes, a circuit including a control current source connected to said winding, and a load connected to said output electrodes to receive said waves therefrom, said source and load each having an impedance substantially equal to the square root of the sum of the squares of the resistance $R_{11}$ across said input electrodes with said output electrodes open-circuited and the ratio $R_{12}$ of the open-circuit voltage across said output electrodes to current flowing through said input electrodes.

15. In combination, an electromagnet comprising a core of magnetic material having a gap therein and an energizing winding thereon, a Hall-effect unit comprising a body of semiconductive material in the form of a prism having substantially equal cross-sectional dimensions and two sets of electrodes on the side faces thereof, a source of waves of voltage E connected to one of said sets of electrodes, a source of waves of frequency $f$ connected to said energizing winding, and an output circuit connected to the other of said sets of electrodes, said cross-sectional dimensions being substantially equal to $6700\sqrt{E/fB}$ where B is the maximum flux density in said body.

WARREN P. MASON.

References Cited in the file of this patent

UNITED STATES PATENTS

| Number | Name | Date |
|---|---|---|
| 2,464,807 | Hansen | Mar. 22, 1949 |
| 2,553,490 | Wallace | May 15, 1951 |

FOREIGN PATENTS

| Number | Country | Date |
|---|---|---|
| 628,791 | Germany | Apr. 2, 1936 |